April 25, 1967 B. T. FOUGHT 3,316,535

COMPARATOR CIRCUIT

Filed April 2, 1965 2 Sheets-Sheet 1

INVENTOR
B. T. FOUGHT
BY
ATTORNEY

3,316,535
COMPARATOR CIRCUIT

Benjamin T. Fought, Columbus, Ohio, assignor to Bell Telephone Laboratories, Incorporated, New York, N.Y., a corporation of New York Filed Apr. 2, 1965, Ser. No. 445,094
16 Claims. (Cl. 340—146.2)

This invention relates to digital circuits and more particularly to circuits for comparing the relative magnitudes of two binary numbers.

In many digital machines it is necessary to determine which of two binary numbers is the greater. For example, in many computers a conditional transfer instruction is provided in which a transfer to one of two different instructions is controlled in accordance with the relative magnitudes of two binary numbers. It is often necessary that the circuit used to compare the two numbers operate very rapidly especially if the machine operation is tied up until after the result of the comparison is determined. As is true of many digital circuits increased speed of a comparator is usually gained only at considerable cost.

In almost all digital comparators the basic technique used is the same. Corresponding bits in the two words to be compared are matched on an individual basis. The most significant bits in the two words are compared to each other and if they are not the same, it is immediately determined that the number with the 1 in the most significant position is the greater of the two. If a match is obtained between the two most significant bits, the adjacent bits are then compared with each other. If an inequality exists it is immediately determined that the number with the 1 in the next to the most significant position is the greater of the two. If, on the other hand, these two bits also match, the next two bits are compared. The sequence continues until an inequality is discovered.

A sequential circuit may be constructed to carry out the steps just described. Each stage of the comparator has two inputs, one from each word, each stage serving to compare corresponding bits in the two numbers. Each stage does not operate, however, until the adjacent higher stage has determined that a match exists. The moment one of the stages determines a mismatch, the result of the comparison is known. The difficulty with such an approach is that considerable time may be required to effect the comparison. For example, if two 20-bit numbers are being compared and the two numbers are equal, before the comparison is terminated, 20 stages must operate in succession.

A much faster but more complex comparator may be constructed based on the following principle. The outputs of all stages may be tied together. An inequality determined by any stage will thus result in an output signal. While this type of circuit is very fast, certain precautions must be taken. Consider, for example, that an output indication is to be derived only if number X is greater than number Y. Each stage is operative to produce an output pulse if the respective X bit is greater than the respective Y bit. Suppose that bit Y is greater than bit X in position 10 but bit X is greater than bit Y in position 3. Stage 3 of the comparator will produce an output pulse indicating that the X word is greater than the Y word. However, the determination by this stage is meaningless since in a more significant position bit Y is greater than bit X, i.e., at least up through bits 10 of the two words Y is greater than X. For this reason if a simultaneous comparison of bits is performed, it is necessary to inhibit the operation of each stage of lesser significance in the comparator when it is determined that in one of the more significant positions bit Y is greater than bit X.

In a 20-bit comparator stage 1 must be inhibited if any of the other 19 stages determines that the respective Y bit is greater than the respective X bit, stage 2 must be inhibited if one of stages 3 through 20 determines that the respective Y bit is greater than the respective X bit, etc. Because it is desired that all stages operate at the same time, it is necessary to feed a signal from each stage to all of the less significant stages. Needless to say, the resulting circuitry may become quite complex. Furthermore, so many signals must be fed back to the least significant stage that fan-in circuitry may be required. The first stage in a 20-bit comparator receives 19 inhibit signals, any one of which must deactivate the stage. An OR gate with 19 inputs is not readily available. It is necessary to provide two levels of logic. Four OR gates, three having five inputs and one having four inputs, may be used, the outputs of the four OR gates feeding into a fifth OR gate. The output of this last gate may control the inhibiting of the first stage. This additional level of logic increases the operating time of the comparator.

It is a principal object of this invention to provide a fast operating yet relatively inexpensive comparator circuit.

It is another object of this invention to allow all stages of a comparator to operate simultaneously without requiring an individual inhibit signal to be transmitted from each stage to all stages of lower order.

In my invention inhibit signals are used to prevent all less significant stages from operating even when these stages determine that a respective X bit is greater than the corresponding Y bit if it is determined by a more significant stage than the respective Y bit is greater than the corresponding X bit. However the number of inhibit signals transmitted toward the least significant stages is approximately one-half the total number of stages. This in itself minimizes the circuit complexity and helps eliminate fan-in levels. Furthermore, as will become apparent the stages of the comparator are very simple in design, easy to construct, and relatively inexpensive.

The basic departure from the prior art lies in the use of a single stage to compare three pairs of corresponding bits in the X and Y words. A single inhibit signal is developed and propagated toward the less significant stages if for either of two bit positions selected from the group of the three bit positions the Y bit is greater than the X bit. In this manner the number of inhibit signals normally required is reduced by a factor of one-half since two pairs of corresponding bits develop only one inhibit signal. Each stage of prior art comparators has been provided with circuitry to inhibit the stage from operating if an inhibit signal is received from a more significant stage. Much of the gating circuitry in each stage is used for detecting the inhibit signals and deactivating the stage. In my invention the gating circuitry in each stage which detects inhibit signals and deactivates the stage need respond to approximately only one-half the number of signals normally received. Thus the cost of the system is reduced still further. While each stage operates on three pairs of corresponding bits one of the pairs of bits is also operated upon by one of the adjacent stages and another of the pairs of bits is operated upon by the other adjacent stage. On the average, therefore, each stage effectively operates on two pairs of corresponding bits.

Each stage of the comparator of my invention operates on bits $n-1$, $n$ and $n+1$ of the X and Y words. (Since on the average each stage operates on two pairs of corresponding bits the stage may be thought of as operating on bits $n$ and $n+1$ with a signal from bits $n-1$ being received from the previous stage, or the stage may be thought of as operating on bits $n$ and $n-1$ and feeding a signal from bits $n+1$ to the next higher stage.) An inhibit signal is developed in each stage if the Y bit is greater than the X bit in either of positions $n$ or $n+1$. An output signal is produced in each stage to indicate that the X word is greater than the Y word if the X bit is greater than the Y bit in either of positions $n$ and $n-1$ providing that the stage is not otherwise inhibited from operating. In addition to circuitry in each stage for comparing corresponding bits, each stage includes a G gate and an I gate. The outputs of the G gates of all stages are tied together. If any G gate operates the common output goes low in potential to indicate that the X word is greater than the Y word.

Consider first the development of the inhibit signal in each stage. If the Y bit is greater than the X bit in either position $n$ or $n+1$ the single inhibit conductor originating at the stage and directed to the less significant stages is energized. This inhibit signal is directed to the G gates of all of the less significant stages. If bit Y is greater than bit X in either position $n$ or position $n+1$ none of the G gates in the less significant stages should operate even if the respective X bits are greater than the corresponding Y bits because at least through bits $n$ or $n+1$ the Y word is greater than the X word. The single inhibit conductor originating at each stage is energized as a result of the comparison of bits $n$ and $n+1$. It makes no difference whether the Y bit is greater than the X bit in position $n$ or $n+1$. As long as one of the Y bits is greater than the corresponding X bit the G gates in the less significant stages must be deactivated because a determination for these stages that one of the respective X bits is greater than the corresponding Y bit is immaterial.

The I gate in each stage operates, i.e., its output goes high in potential which is the converse of the G gate operation, if the X bit is greater than the Y bit in either of positions $n$ and $n-1$. If the I gate operates it attempts to operate the G gate in the same stage. The G gate is inhibited from operating however if an inhibit signal is received from a higher stage or if an inhibit signal is developed in the same stage itself, i.e., the Y bit is greater than the corresponding X bit in either position $n$ or $n+1$. Assuming that inhibit signals are not received from higher stages consider the two ways in which an output signal may be produced in any stage. If the X bit is greater than the Y bit in position $n-1$ the I gate will operate. The operation of the I gate attempts to operate the associated G gate. However, the inhibit signal developed in the stage prevents the G gate from operating if the Y bit is greater than the X bit in position $n$ or $n+1$. If a Y bit is greater than the corresponding Y bit in either of these two positions an output signal should not be produced since the relative magnitudes of the $n-1$ bits are immaterial in determining which of the two words is greater. The I gate also operates if in position $n$ the X bit is greater than the Y bit, and attempts to operate the associated G gate. The G gate may still be inhibited however if an inhibit signal is developed in the stage because the Y bit is greater than the X bit in position $n+1$. Again, this is the desired effect because the relative magnitudes of the bits in position $n$ are immaterial if the Y bit is greater than the X bit in position $n+1$. As for the development of an output signal if bit X is greater than bit Y in position $n+1$, a signal is fed forward to the next higher stage where bits $n+1$ are treated in the same manner as are bits $n-1$ in the previous stage.

It is a feature of this invention to provide a series of comparator stages, each for operating on three corresponding pairs of bits in adjacent positions in two input word in such a manner that, on the average, one stage is provided for comparing corresponding bits in two bit positions.

It is another feature of this invention to develop an inhibit signal in each stage, extending to all lower order stages, if an inequality exists between corresponding bits in either of the two bit positions selected from the three bit positions operated upon by the stage.

It is still another feature of this invention to produce an output signal in each stage if an inequality exists between corresponding bits in either of another pair of bit positions of the three bit positions operated upon by the stage, provided an inhibit signal is not produced in the same stage and no inhibit signals are received from higher order stages.

Further objects, features and advantages of the invention will become apparent upon consideration of the following detailed description in conjunction with the drawing in which.

Figure 1:
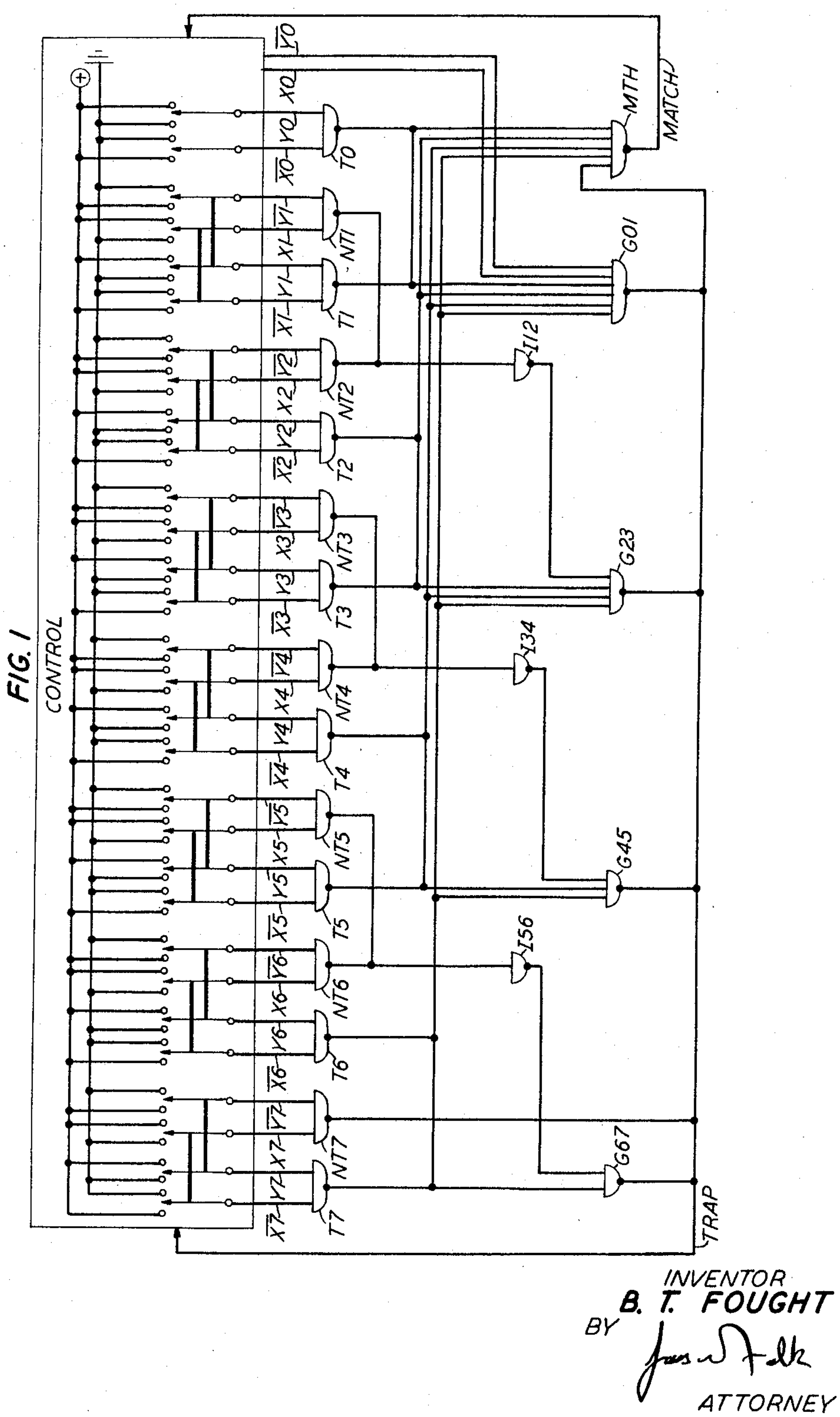
FIG. 1 is an illustrative embodiment of my invention designed to compare two 8-bit binary numbers and for developing a first output (TRAP) signal if number X is less than or equal to number Y and a second output signal (MATCH) if the two numbers are equal.

The control of FIG. 1 is operative to apply bit signals to conductors $\overline{Y0}$ through $\overline{X7}$. These 32 conductors contain bit signals representing the X and Y words to be compared. The mechanism in the control circuit for applying the bit signals is symbolic only and it is to be understood that in conventional data processors the signals will be derived from electronic circuitry. A 1 is represented by a positive potential and a 0 is represented by ground potential. Pairs of switches in the control circuit are tied together so that opposite potentials are applied to each input conductor and its inverse. For example if the switches connected to conductors Y7 and $\overline{Y7}$ are moved to the right ground potential is applied to conductor $\overline{Y7}$ and a positive potential is applied to conductor Y7 to indicate that bit 7 in the Y word is a 1. If the two switches are moved to the left ground potential is applied to conductor Y7 and a positive potential is applied to conductor $\overline{Y7}$ to indicate that bit 7 in the Y word is a 0.

Included in the circuit are a series of T gates and a series of NT gates. Each of the gates in FIG. 1 operates as follows: The output is low in potential only if all inputs are high in potential; if at least one input is low the output is high. Each of the T gates and each of the NT gates has two inputs, one of the inputs representing a bit in one of the words and the other input representing the inverse of the corresponding bit in the other word. Consider first the T gates, e.g., gate T4. The output of this gate is high under all conditions unless bit Y4 is a 1 and bit X4 is a 0. Gate T4 operates, i.e., its output goes low, only if the Y bit is greater than the corresponding X bit in position 4. The operations of the NT gates are exactly the opposite. The output of an NT gate is high under all conditions unless than respective X bit is a 1 and the corresponding Y bit is a 0. Consider gate is high under all conditions unless the respective X4 is a 1 and bit Y4 is a 0. The T and NT gates operate only if inequalities exit between respective corresponding bits. If corresponding bits are equal (both 0's or both 1's) nothing can be determined from them about the relative magnitudes of the two words and the outputs of the respective T and NT gates remain high. The outputs of these gates are connected to the inputs of the various I and G gates. If the output of a T or NT gate is high it has no effect on a connected I or G gate since the output of this latter gate is determined solely by the other inputs; if all of the other inputs are high the output is low, and if at least one input is low the output is high.

Each of the G gates is associated with two bit positions. Gate G23 for example is connected to the outputs of gates T2 and T3. The outputs of gates T2 and T3 together form one input of gate G23. Another input of gate G23 is the output of gate I12, gate I12 being associated with gates NT1 and NT2 which together form its input. The other inputs to gate G23 are the inhibit signals from the higher order stages.

The outputs of all G gates are tied to the single TRAP conductor. The output of each gate is normally high. If the output of any one of the G gates goes low the TRAP lead goes low to indicate to the control circuit that the X word is greater than the Y word. The individual gates used in FIG. 1 are designed so that their output terminals may be tied together in such a manner that if any one of them goes low the common output lead goes low as well. It will be recalled that each stage operates on bits $n-1$, $n$ and $n+1$. The I gate of each stage operates if bit X is greater than bit Y in either of positions $n$ and $n-1$. If the I gate operates it attempts to operate the connected G gate. The G gate is inhibited however if bit Y is greater than bit X in either position $n$ or $n+1$, or if an inhibits signal is received from a higher stage.

The inhibit signal produced in each stage and extended to the lower stages is a direct result of bit Y being greater than bit X in either of positions $n$ or $n+1$. A typical stage in the circuit of FIG. 1 includes gates K54 and I34 which operate on bits 3, 4 and 5. An inhibit signal is produced if either of gates T4 and T5 operates, i.e., bit 4 in the Y word is greater than bit 4 in the X word or bit 5 in the Y word is greater than bit 5 in the X word. In either case the horizontal conductor connected to the outputs of gates T4 and T5 goes low. This conductor is connected to an input of each of the G gates G45, G23 and G01 and the output of each of these gates remains high. The input to gate I34 goes low if the output of at least one of gates NT3 and NT4 goes low. In such a case the output of gate I34, one of the inputs of gate G45, goes high to operate this gate, i.e., to cause its output and the TRAP lead to go low if the other inputs of gates G45 are all high.

Figure 2:
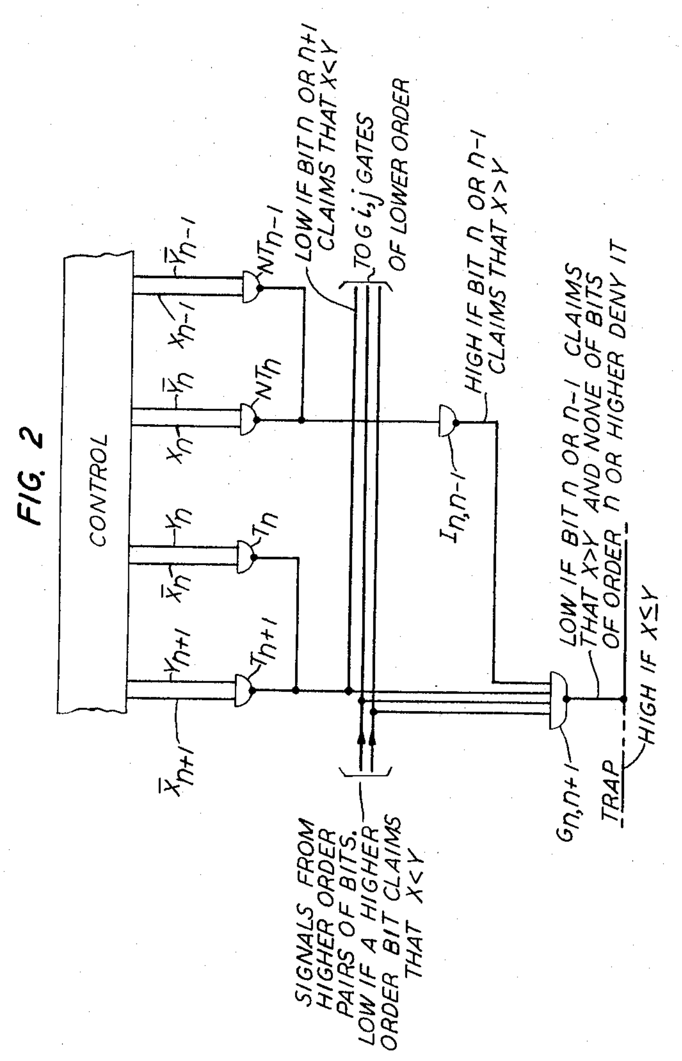
FIG. 2 is a schematic representation of one stage of the circuit of FIG. 1.

With this background a typical stage of the comparator, shown in FIG. 2, may be considered. The stage operates on the bits in positions $n-1$, $n$ and $n+1$, e.g., positions 3, 4 and 5. For every three pairs of bits there are three T gates and three NT gates. It will be noted that the stage of FIG. 2 includes only two T gates and only two NT gates. The stage operates on both the T and the NT gates in position $n$. Of the two gates associated with position $n-1$ only the NT gate is connected to the stage. The T gate associated with position $n-1$ is included in the adjacent stage in the circuit to the right. Only the T gate in position $n+1$ is connected to each stage. The corresponding NT gate is included in the adjacent stage in the circuit to the left.

As described above an inhibit signal is developed in each stage if bit Y is greater than bit X in either of positions $n$ or $n+1$. In such a case the corresponding T gate operates and its output goes low. As seen in FIG. 2 the inhibit signal developed by the stage is extended to all lower order G gates. The inhibit signal developed by the stage is also one of the inputs of the G gate included in the stage. The inhibit signals received from higher order stages are also inputs of this G gate. If any inhibit signal is low the output of gate $Gn,n+1$ is high, independent of the operation of gate $In,n-1$. The important point to note is that each pair of corresponding bits develops a single inhibit signal which is extended to stages of lower order. It is the G gates which force the TRAP lead to go low to indicate that the X word is greater than the Y word. If the Y bit in position $n$ or $n+1$ is greater than the corresponding X bit all of the G gates in the lower order stages are inhibited from operating because the fact that a lower order X bit is greater than the corresponding Y bit is immaterial. Gate $Gn,n+1$ is also inhibited from operating if the $n+1$ Y bit is greater than the $n+1$ X bit because at least through bit position $n+1$ the Y word is greater than the X word. If the Y bit in position $n$ is greater than the X bit in position $n$ gate $Gn,n+1$ also does not operate. However, the TRAP lead should go low if the X bit in position $n+1$ is greater than the corresponding Y bit and all corresponding higher order bits are equal. In such a case the I gate in the next higher stage will operate and the TRAP lead will go low as a result of the operation of gate $Gn+2,n+3$.

Thus far the inhibit circuitry in each stage has been described. Each stage also includes circuitry for operating the respective G gate if it is not inhibited and bit X is greater than bit Y in position $n$ or $n-1$. Each of the two NT gates in FIG. 2 operates if the respective X bit is greater than the corresponding Y bit. In such a case the input to gate $In,n-1$ goes low and its output goes high. Thus one input to gate $Gn,n+1$ is high. If no inhibit signals are received by gate $Gn,n+1$ from either of the T gates in the same stage or from higher order stages, all of the inputs to the G gate are high, and the output goes low to indicate that the X word is greater than the Y word. As seen in the drawing the output of the I gate is high only if the X bit is greater than the Y bit in position $n$ or $n-1$. The I gate attempts to operate the associated G gate. The G gate should operate however only if no Y bit is greater than the corresponding X bit in all higher positions beginning with position $n$. As seen in the drawing the output of gate $Gn,n+1$ goes low if an X bit is greater than the corresponding Y bit in position $n$ or $n-1$ and none of the Y bits of order $n$ or higher are greater than the corresponding X bits.

The basic stage of FIG. 2 is repeated again and again in the comparator circuit of my invention as seen in FIG. 1. The end stages however may be simplified. The output of gate NT7 would be connected to the I gate of the succeeding stage were such a stage included in FIG. 1. Since there is no such succeeding stage the output of gate NT7 is tied directly to the TRAP lead. The output of this gate is low only if bit 7 in the X word is greater than bit 7 in the Y word. In such a case the X number is greater than the Y number and the TRAP lead goes low. Input conductors X0 and $\overline{Y0}$ should ordinarily be connected to the input of a gate NT0 and the output of this gate tied to the output of an NT gate from a previous stage. There is no such previous stage however in the circuit of FIG. 1 and by tying conductors X0 and $\overline{Y0}$ directly to respective inputs of gate G01, gate NT0 and the I gate normally required in the stage may be omitted. Gate G01 can operate only if none of the eight Y bits are greater than the corresponding X bits, i.e., all inhibit conductors are high. Gate G01 should operate if bit X0 is a 1 and bit Y0 is a 0. In such a case conductors $\overline{Y0}$ and X0 are both high and the output of gate G01 goes low as required.

The TRAP lead remains high if X is not greater than Y. However, it may be desired to determine if the two numbers are equal. For this reason gate MTH is provided. The inhibit conductors extended from all stages serve as inputs to this gate. They are all high if none of the Y bits are greater than the corresponding X bits. The TRAP lead is the last input to gate MTH. This lead is also high if the X word is not greater than the Y word. Thus the output of gate MTH goes low to indicate a MATCH of the two numbers if none of the Y bits are greater than the corresponding X bits and none of the X bits are greater than the corresponding Y bits, i.e., the two numbers are equal.

The basic circuit of FIG. 1 may be extended to operate on binary numbers of any length. Numerous modifications are possible. For example, in the circuit of FIG. 1 the inhibit signals are extended to the lower order stages if higher order Y bits are greater than the corresponding X bits. It is possible however to design a system in which the inhibit signals are produced if either one of a pair of X bits is greater than the corresponding Y bit. The relative magnitudes of lower order bits are immaterial since an inequality exists between two higher order bits. Similarly, the principles of the invention may be applied to comparators operating on other than binary numbers, e.g., decimal numbers. Although numerous modifications are possible, in all of them the number of inhibit signals is materially reduced by providing a series of stages, each of which, on the average, effects the comparison of two pairs of digits.

Figure 3:
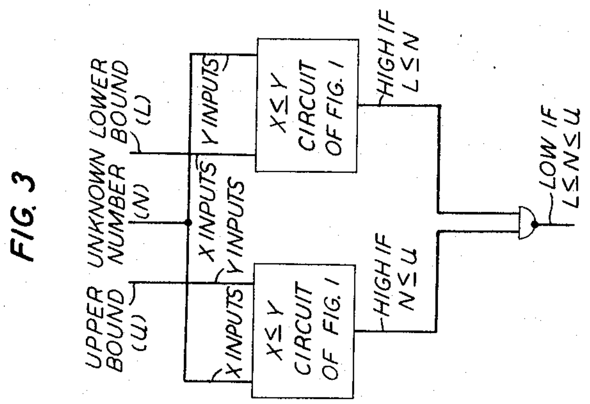
FIG. 3 shows the connection of two comparators along the lines of FIG. 1 for determining if a given number lies within upper and lower bounds.

The TRAP lead in FIG. 1 goes low only if X is greater than Y. If X is equal to or less than Y the TRAP lead remains high. In some applications it may be necessary to determine if a given number lies within (and including) upper and lower bounds. Two circuits along the lines of that of FIG. 1 plus an additional gate may be combined for this purpose as shown in FIG. 3. The upper bound number is applied as the Y inputs of the upper comparator and the lower bound number is applied as the X inputs of the lower comparator. The unknown number is applied to the X inputs of the upper comparator and the Y inputs of the lower comparator. Thus the output TRAP lead of the upper circuit is high only if the upper bound is greater than or equal to the unknown number. The output TRAP lead of the lower circuit is high only if the unknown number is greater than or equal to the lower bound. The output of the gate, which is low only if both inputs are high, is thus low only if the unknown number lies within the upper and lower bounds. The circuit of FIG. 3 is included to illustrate the variety of circuits which may be constructed utilizing the basic comparator circuit of my invention.

Although the invention has been described with respect to a particular embodiment it is to be understood that numerous modifications may be made therein and other arrangements may be devised without departing from the spirit and scope of the invention.

What is claimed is:

1. A comparator circuit for comparing a first binary number with a second binary number comprising a plurality of stages, means for applying signals representative of three corresponding adjacent bits in each of said numbers to respective ones of said stages with signals representative of alternate bits in each of said numbers being applied to two adjacent ones of said stages, output means in each of said stages, means in each of said stages responsive to either of the respective two most significant bits in said second number being greater than the corresponding bit in said first number for inhibiting the output means in the same stage, means connecting each of said inhibiting means to the output means in all lower order stages for inhibiting the operation of all lower order output means responsive to the operation of said each inhibiting means, means in each of said stages responsive to either of the respective two least significant bits in said first number being greater than the corresponding bit in said second number for operating the respective output means if said respective output means is not inhibited from operating, and means responsive to the operation of any one of said output means for indicating that said first number is greater than said second number.

2. A comparator circuit in accordance with claim 1 further including means responsive to the operation of none of said inhibiting means and the operation of none of said output means for indicating the equality of said first and second numbers.

3. A comparator circuit for comparing first and second numbers comprising a plurality of stages, means for extending to each of said stages signals representative of the values of respective corresponding pairs of adjacent bits in each of said numbers, means in each of said stages responsive to either one of the two respective bits in said second number being greater than the corresponding bit in said first number for deactivating said each stage and for deactivating all lower order stages, and output means in each of said stages operative responsive to the least significant bit of the respective pair of bits in said first number being greater in value than the corresponding bit in said second number or the most significant bit of the respective pair of bits in said first number associated with the next lower order stage being greater in value than the corresponding bit in said second number.

4. A comparator circuit in accordance with claim 3 further including means responsive to none of said stages being deactivated and none of said output means being operated for indicating the equality of said first and second numbers.

5. A comparator circuit for comparing first and second numbers comprising a plurality of stages, means for extending to each of said stages signals representative of the values of respective corresponding pairs of adjacent bits in each of said numbers, output means in each of said stages operative responsive to either one of the two respective bits in said first number being greater than the corresponding bit in said second number, and means in each of said stages responsive to the most significant bit of the respective pair of bits in said second number being greater in value than the corresponding bit in said first number or the least significant bit of the respective pair of bits in said second number associated with the next higher order stage being greater in value than the corresponding bit in said first number for inhibiting the operation of the output means in said each stage and for inhibiting the operation of the output means in all lower order stages.

6. A comparator circuit in accordance with claim 5 further including means responsive to none of said output means being operated and none of said inhibiting means being operated for indicating the equality of said first and second numbers.

7. A comparator circuit for comparing a first binary number with a second binary number comprising a plurality of stages, means for extending signals representative of the bit values in said first and second numbers to said stages, means in each of said stages responsive to either one of two respective bits in said second number being greater in value than the corresponding bit in said first number for deactivating said each stage and for deactivating all lower order stages, and output means in each of said stages operative responsive to either of two respective bits in said first number being greater in value than the corresponding bit in said second number if said each stage is not deactivated by said deactivating means.

8. A comparator circuit in accordance with claim 7 further including means responsive to none of said deactivating means being operated and none of said output means being operated for indicating the equality of said first and second numbers.

9. A comparator circuit for comparing a first binary number with a second binary number comprising a plurality of stages, means for extending signals representative of the bit values in said first and second numbers to said stages, means in each of said stages responsive to an inequality between either one of two respective pairs of corresponding bits in said first and second numbers for deactivating said each stage and for deactivating all lower order stages, and output means in each of said stages operative responsive to either of two respective bits in said first number being greater in value than the corresponding bit in said second number if said each stage is not deactivated.

10. A comparator circuit for comparing a first number with a second number comprising a plurality of stages, means for extending signals representative of the digit values in said first and second numbers to said stages, means in each of said stages responsive to an inequality between either one of a respective pair of digits in said first number and the corresponding digit in said second number for deactivating said each stage and for deactivating all lower order stages, and output means in each of said stages operative responsive to either of two respective digits in said first number being greater in value than the corresponding digit in said second number if said each stage is not deactivated.

11. A comparator circuit for comparing a first number with a second number comprising a plurality of stages, means for extending signals representative of the digit values in said first and second numbers to said stages, means in each of said stages responsive to first predetermined inequalities between respective corresponding digits in said first and second numbers for deactivating said each stage and for deactivating all lower order stages, and output means in each of said stages operative responsive to second predetermined inequalities between respective corresponding digits in said first and second numbers if said each stage is not deactivated.

12. In a comparator circuit for comparing a first plural digit number with a second plural digit number, each of said numbers having each of said plural digits in a prescribed positioned order of significance, means for extending signals representative of digit values of said numbers, a plurality of comparator networks, each of said networks operative for comparing signals of three adjacent ordered digits in each of said numbers extended by said means and comprising gate means for comparing extended signals of correspondingly significant digits in said numbers in said first, second and third digit positions thereof, output means selectively controllable by comparisons in said gate means of said digit values in said first, second and third digit positions for supplying an output signal indicating a first predetermined value relationship between said numbers, and means in said output means responsive to comparisons by said gate means of said digit values in each predetermined one of said digit positions for inhibiting said output means and thereby to supply another output signal indicating a second predetermined value relationship between said numbers, said inhibiting means including means for inhibiting the output means of all of the comparator networks comparing digit values of said numbers in lower ordered digit positions than said third digit position.

13. In a comparator circuit according to claim 12 wherein said gate means of each comparator network comprises first and second gate devices for individually comparing extended signals for correspondingly significant digits of said two numbers in said first and second digit positions respectively, and each of said first and second gate devices comprising a first gate apparatus which has a pair of input termini for receiving extended digit signals from said extending means and an output terminus connected to said output means of said each comparator network and all of said comparator networks comparing digit values of said numbers in lower ordered digit positions for controlling said inhibiting thereof.

14. In a comparator circuit according to claim 13 wherein said gate means of each comparator network comprises a third gate device for individually comparing extended digit signals of said two numbers in said third digit position, said third gate device having a pair of input termini for receiving extended digit signals from said extending means and an output terminus, and further comprising an inverter gate apparatus having an input terminus connected to said output terminus of said third gate device of said each comparator network and an output terminus connected to said output means and being responsive to comparisons by said third gate device for controlling said output means selectively to supply said output signals for indicating said first and second predetermined value relationships between said two numbers.

15. In a comparator circuit according to claim 14 wherein said output means comprises a gate arrangement having a first input terminus connected to the output terminus of said inverter gate apparatus, a second input terminus connected to said output terminus of each of said first and second gate devices and an output terminus, said arrangement being responsive to the receipt of signals on said last-mentioned input termini for selectively supplying said output signals at its said output terminus for indicating said first and second predetermined value relationships between said two numbers.

16. In a comparator circuit according to claim 15 further comprising match gate circuitry responsive to the receipt of output signals from said output gate arrangement and said inhibiting means of each of said comparator networks for indicating the matched equality of said first and second numbers.

References Cited by the Examiner

UNITED STATES PATENTS

| | | | |
|---|---|---|---|
| 2,965,298 | 12/1960 | Ketchledge | 235—175 |
| 2,984,824 | 1/1961 | Armstrong et al. | 340—172.5 |
| 3,010,654 | 11/1961 | Ketchledge | 235—175 |
| 3,143,645 | 8/1964 | Armstrong | 235—177 |

MALCOLM A. MORRISON, *Primary Examiner.*

M. J. SPIVAK, *Assistant Examiner.*